Feb. 27, 1940.   J. C. THOMAS   2,191,837
BATTERY SERVICING KIT
Filed March 18, 1937   3 Sheets-Sheet 1
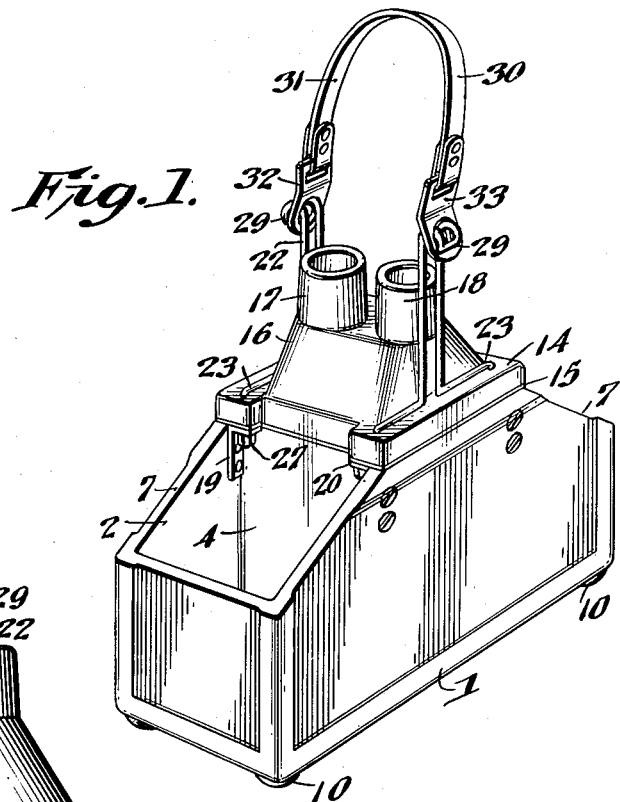
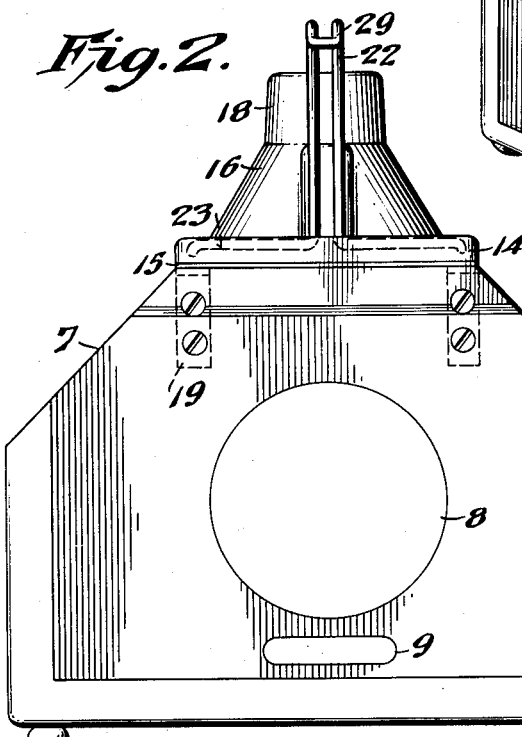
Inventor
J. C. Thomas
By Lloyd W. Batch
Attorney Feb. 27, 1940.    J. C. THOMAS    2,191,837
BATTERY SERVICING KIT
Filed March 18, 1937    3 Sheets-Sheet 2
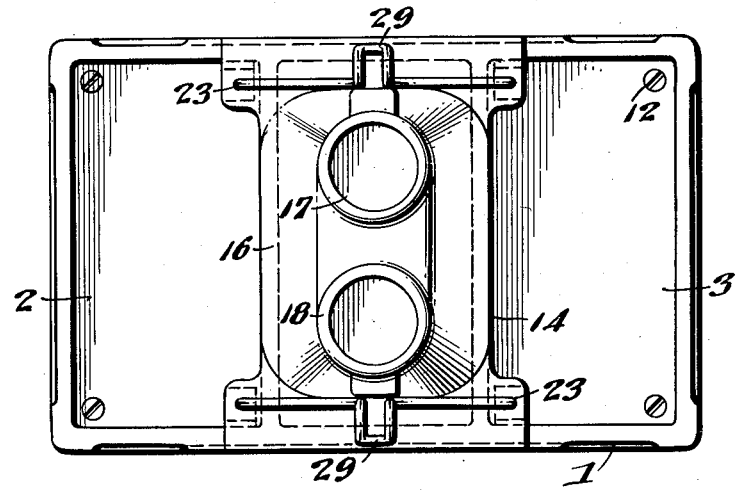
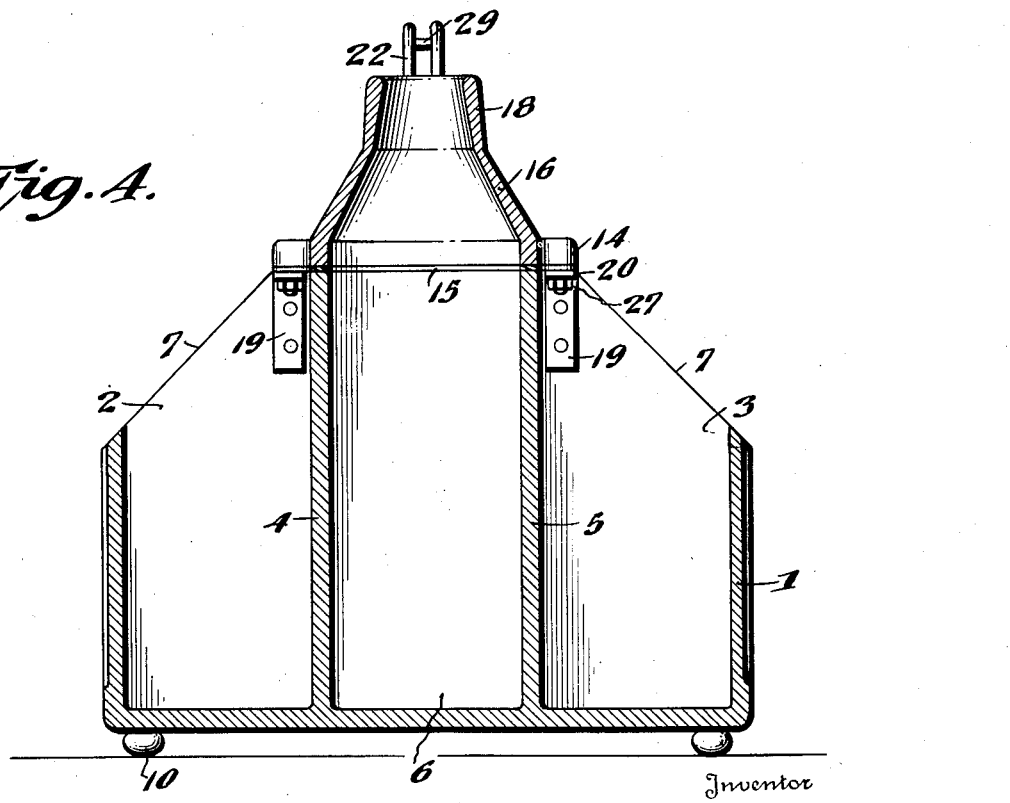
Inventor
J. C. Thomas
By Lloyd W. Patch
Attorney Feb. 27, 1940. J. C. THOMAS 2,191,837
BATTERY SERVICING KIT
Filed March 18, 1937 3 Sheets-Sheet 3
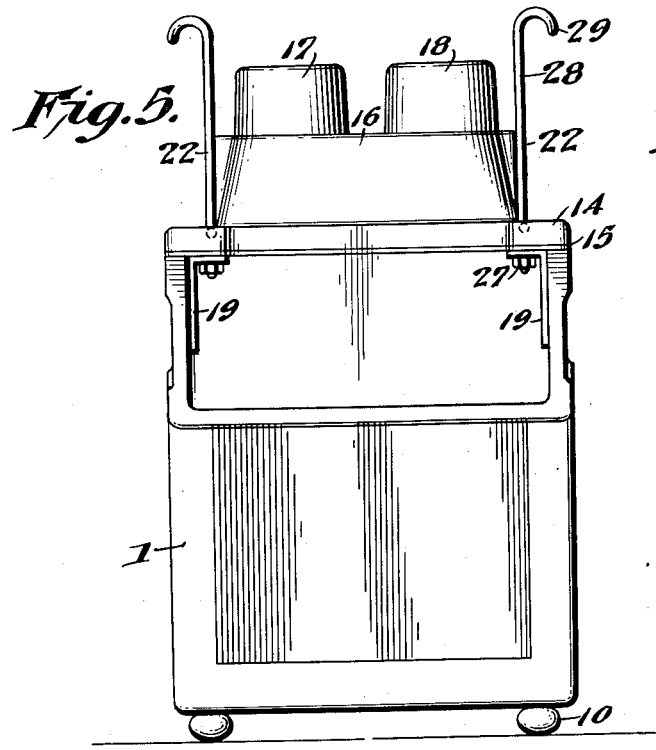
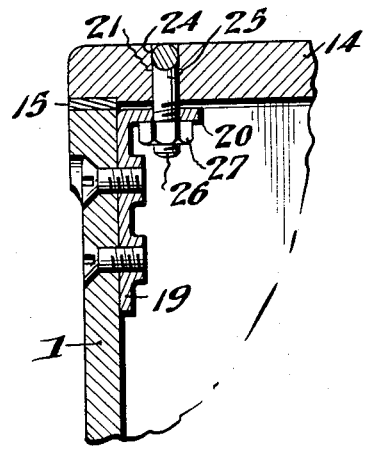
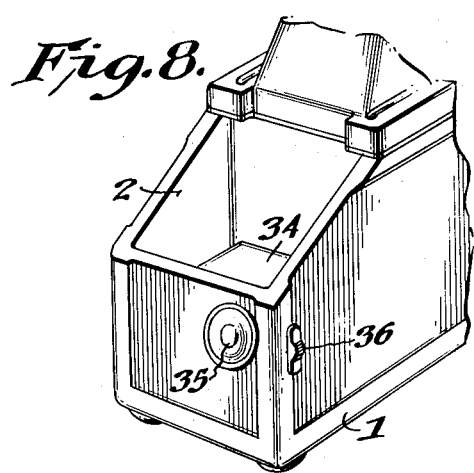
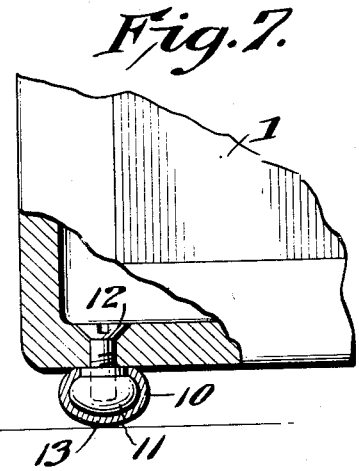
Inventor
J. C. Thomas
By Lloyd W. Patch
Attorney Patented Feb. 27, 1940

2,191,837

UNITED STATES PATENT OFFICE 2,191,837

BATTERY SERVICING KIT

Joseph C. Thomas, Akron, Ohio, assignor to E. Edelmann & Co., Chicago, Ill., a corporation of Illinois Application March 18, 1937, Serial No. 131,741

2 Claims. (Cl. 224—45)

My invention relates to improvements in battery servicing kits, and particularly to a device of this character intended and adapted to contain or hold battery servicing implements and parts, and battery servicing liquid.

An object of my invention is to provide a battery servicing kit having a body portion cast or formed as a single unitary structure to include a compartment for containing implements and parts used in servicing a battery and a divided off chamber for liquid desired for battery servicing.

Another object is to provide a battery servicing kit of this character in which the body portion is made of hard rubber or other material resistant to or not affected by battery acids and other deleterious liquids and materials ordinarily encountered in use.

Still another object is to provide a device of this character which is of simple and inexpensive construction and with which the parts are conveniently and quickly assembled and will not be readily broken or damaged by ordinary shock incident to falls, while at the same time the construction and materials are such that the danger and likelihood and possibility of damage to the body or finish or other parts or portions of an automobile or other structure about or around which the kit is ordinarily used is reduced to a minimum.

Still another purpose is to so construct the battery servicing kit that compartments are provided for tools and servicing or replacement parts or the like, and a divided off and entirely separate chamber is provided for distilled water or other battery servicing liquid; and, convenient holding and supporting means or structure is provided to receive and carry a hydrometer and battery filler or other instruments or instrumentalities ordinarily used in testing or servicing batteries, said holding and supporting means being such that the instruments are supported and carried in a manner to reduce the likelihood of breakage or damage to any parts of said instruments.

A further object is to provide means and structure to support and hold a hydrometer, or other servicing instrument ordinarily having glass or breakable parts, so that the parts of this instrument most likely to be damaged by contact or shocks are fully encased and are held in position and relation to minimize possibility of damaging contact while being carried or while being removed or replaced.

Yet a further object is to so construct the instrument holding means that this means serves as an anti-splash or splash proof cover for the liquid chamber, to thus avoid splashing or spilling of the liquid contents when the battery servicing kit is being handled or carried.

Yet another object and purpose is to provide a handle connecting means upon the body portion of the servicing kit adapted to detachably receive and connect a battery holder or carrier, to thus provide a serviceable handle for the battery servicing kit whereby the same may be supported and carried to prevent spilling of the contents of the compartments and chamber, and at the same time the battery carrier and holder is at all times readily and conveniently available for detachment to be used in handling and carrying a storage battery, thus making unnecessary the provision and carrying of a separate battery carrier or holder.

Still another purpose is to provide cushion portions, in the form of feet, upon the body portion, to absorb and cushion shocks that might otherwise cause damage to the battery servicing kit or to the body and finished portions or other extraneous structure with which the body of the servicing kit might otherwise come into contact.

A still further object is to provide lighting means in combination with the body portion of the servicing kit, which lighting means can be employed to illuminate a battery compartment or other place where the battery servicing is to be accomplished.

With the above and other objects in view, some of which will be hereinafter set forth, and others of which will be apparent to those skilled in the art, my invention includes certain novel features of construction and combinations and arrangements and associations and assembly of parts, which will be hereinafter set forth in connection with the drawings and pointed out in the claims.

In the drawings:

Figure 1 is a view in perspective illustrating a battery servicing kit constructed in accordance with my invention.

Fig. 2 is an enlarged view in side elevation with the battery carrier handle detached.

Fig. 3 is a top plan view of the showing in Fig. 2.

Fig. 4 is a longitudinal vertical sectional view through the structure.

Fig. 5 is a view in end elevation of the disclosure in Fig. 2.

Fig. 6 is an enlarged fragmentary sectional view to better show the handle and cover attaching means.

Fig. 7 is an enlarged broken fragmentary sectional view illustrating one of the cushion feet.

Fig. 8 is a fragmentary broken perspective view illustrating a modified construction.

My improved battery servicing kit has the body portion 1 thereof molded, or otherwise formed as a single unitary structure, from hard rubber, a phenolic condensation product, or other material which is not affected by or is resistant to battery acids and other solutions ordinarily encountered in battery servicing. This body portion adjacent to each end has the servicing tool and parts compartments 2 and 3, and spaced walls 4 and 5 extending transversely between the sides of the body portion to form and provide a liquid chamber 6. The transverse walls 4 and 5 extend to the top of the body portion, and it is perhaps preferable that the end walls of the body be somewhat lower and that the side walls be sloped or inclined or reduced downwardly, as at 7, to these lower end walls to thus give more ready access to the compartments 2 and 3. By molding the body portion 1 in a single unitary structure with the bottom and sides and end walls and the partitions 4 and 5 integral, the structure is readily and conveniently and inexpensively manufactured, and the possibility of leakage of distilled water or other battery servicing liquid from the liquid chamber 6 is avoided.

In addition to making possible the construction of a unitary body portion, the molded material is impervious or resistant to battery acids, to thus avoid damage from the spilling of the battery solution or the like, the molded material is not readily broken or damaged by ordinary shocks in use and the contact of this body of molded material with automobile body or other portions will not ordinarily mar the finish or damage the parts, and further, the formation of the molded material is accomplished in steps and operations which lend themselves particularly well to the application of special designs and ornamental effects, to the provision of name panels or strips, as indicated at 8 and 9 in Fig. 2, to the showing of lettering and other designs or subject matter upon the body portion, and in fact to the completion in a single operation of a finished body structure.

As a further precaution to prevent damage of the body portion 1, or automobile or other structures around which the servicing kit may be used, I provide cushion feet 10 adjacent to the four corners of the bottom of the body portion 1. As best shown in Fig. 7, these cushion feet have a button or headed or rounded body portion 11 held in place by a mounting screw 12, or by other suitable fastening means, and a cup-like cover 13, of soft rubber, or of other suitable cushion material, is fitted over and by its own inherent resiliency retracts to hold upon the body portion 11. With this construction, the supporting feet 10 are readily and quickly applied, and the rubber or cushion cover 13 will hold in place for its entire life, and can be readily replaced if the cover should become worn or damaged.

A splash proof cover 14 is provided to fit over the top of the liquid chamber 6 and to bear at its edges against the upper or top edges of the transverse walls 4 and 5 and the intermediate top edges of the side portions of the body 1, and a packing washer or gasket 15 is interposed upon these top edges to pack between the cover 14 and the adjacent portions of the body structure 1. This top 14 is intended and adapted to cover the top of the liquid chamber 6 to prevent spilling and splashing of distilled water, or other battery servicing liquid, and to prevent ingress of dirt or other materials that might render the liquid unfit for the use intended, and the cover has a sidewall portion 16 inclined upwardly and inwardly from the top edges of the several adjacent walls of the body 1. Annular sleeves 17 and 18 are provided on the wall 16 to extend upwardly beyond the same, and the openings of the sleeves give access to the interior of the liquid chamber 6.

In the servicing of storage batteries, it is customary to use hydrometers or battery testers having glass liquid receiving barrels or other portions of glass or other frangible material, and to employ battery fillers usually having a suction bulb provided with a liquid intake and discharge nozzle; and, the openings of the sleeve portions 17 and 18 are intended and adapted to receive and support and carry a hydrometer, a battery filler, or other battery servicing instruments, to thus have these instruments or instrumentalities readily available for use, and prevent spilling of any liquid from the nozzles of the instruments. In use, the body portions of the hydrometer, battery filler, or other instrument will be inserted through the openings of the sleeves 17 and 18, and the bulb portions of the instruments will rest upon the upper edges of the sleeve portions to close the openings and thus exclude dirt and other foreign matter from the liquid chamber 6. As best shown in Fig. 4, it is preferable that the openings of the sleeves 17 and 18 be flared or widened from the mouth ends to thus reduce the possibility of contact laterally with frangible glass liquid barrels or other breakable portions of hydrometers and other battery servicing instruments.

It is essential that the body portion 1 be handled and supported and carried in upright relation to prevent spilling of the contents of the compartments and of the chamber, and also it is necessary that the cover structure 14 be secured in place. Upon the side walls of the body 1, I provide and secure the several supporting clips 19. As best shown in Fig. 6, these clips 19 are provided with inturned flanges 20 extending inwardly beneath a portion of the cover 14, and provided with fastening receiving openings. The cover 14 also has fastening receiving openings 21 therethrough positioned to register with the fastening receiving openings of the flanges 20 of the supporting clips 19. Supporting hooks 22, each of which can be bent up or formed from a single length of wire or rod material, have their end portions bent outwardly, as at 23, to extend in grooves or recesses 24 formed in the cover 14, and these ends have their extremities 25 bent or shaped downwardly to pass through the openings 21 of the cover and the aligned openings of the flanges 20 of the clips 19. These ends are externally screw threaded, as shown at 26, and clamp nuts 27 are turned onto the threaded ends to bear against the inner sides of the flanges 20 and thus secure the supporting hooks 22 in rigid mounting, and at the same time clamp the cover 14 and the packing washer or gasket 15 against the upper edges of the body portion to establish a liquid tight connection of the top around the upper edge of the liquid chamber 6.

These supporting hooks 22 preferably have their shank portions 28 extended upwardly to dispose the hook ends 29 above the sleeve portions 17 and 18, and the supporting hooks are sufficiently spaced laterally from these sleeve portions to permit free and ready insertion into and removal from the openings of the sleeves of hydrometers and other battery servicing instruments. A battery carrier 30 is required for servicing operations around the battery, and for lifting and carrying a storage battery, and in the present instance I have shown this battery carrier 30 as having a flexible handle or band 31 with clip portions 32 and 33 carried at its ends and provided with openings to fit and hold upon the posts of a storage battery. As illustrated in Figure 1, this battery carrier 30 has the hook portions 29 caught through the openings of the clip ends 32 and 33, and thus the battery carrier 30 is detachably connected to serve as a supporting and carrying handle for the body 1 of my improved battery servicing kit, and the parts associated therewith. By grasping the flexible handle 31 of the battery carrier 30, connected as a handle, a mechanic or other person can lift, support and carry the body portion in upright relation to prevent spilling of the contents of the compartments 2 and 3 or the liquid contents of the liquid chamber 6. Ordinarily, the battery carrier 30 will remain in place as a handle, but this battery carrier can be readily removed for use in lifting and handling a storage battery, or to give freer access to the openings through the sleeves 17 and 18. Due to the fact that the clip portions 32 and 33 have substantially circular openings therein, these clip portions can pivot on the hook portions 29, and the handle part 31 can be swung forwardly or rearwardly to allow more ready access to the openings of the sleeves, without removal or detachment of the handle portion.

In automobiles it is customary to install storage batteries beneath the floor, under a seat, or in some other place or compartment where the full entrance of light is prevented, so that often the battery structure is in such shadow or darkness that the mechanic or other person desiring to service the same has considerable difficulty in performing the proper and desired servicing operations, and with this in mind I provide lighting means, as best shown in Fig. 8, in conjunction with my battery servicing kit to permit illumination of a battery being serviced. As here shown, a case 34 is carried by the body portion 1, within either compartment 2 or 3, and adjacent to one of the ends of the body, this case 34 being adapted to contain batteries or cells, and other parts of a flashlight or like structure, and a bulb 35, or other light emitting structure associated with this case 34 is disposed on the outside of the end of the body 1. A switch 36, of usual or desired form, can be applied or mounted at any convenient position, and through this switch the structure within the case 34 is controlled to energize and deenergize the light emitting portion 35 carried on the outside or end of the body 1. With this construction and arrangement, the light emitting portion is disposed in a position and arrangement to be readily and fully and conveniently available for illuminating a battery compartment, a battery, or other item being serviced, and the servicing kit can be supported and carried by the handle structure 30, in one hand, with the light emitting portion 35 directing light rays to illuminate the battery, while the other hand of the user can be employed in battery servicing operations.

From the foregoing it will be seen that I have provided a battery servicing kit of simple and inexpensive construction, which has the main portions thereof formed or constructed to resist or be unaffected or damaged by materials and conditions ordinarily encountered in use, and which disposes and places immediately available all materials and instrumentalities required for ordinary battery servicing operations.

While I have herein shown and described only certain specific embodiments of my invention and have suggested only certain possible modifications, it will be appreciated that many changes and variations can be made in the form, construction, arrangement, assembly and association of the parts, without departing from the spirit and scope of my invention.

I claim:

1. A battery servicing kit comprising, a body portion of molded material resistant to battery acid having unitarily therein at the ends compartments to contain servicing implements and parts and centrally a molded in chamber for battery servicing liquid, a cover for said chamber having an opening to give access to the liquid chamber and provided with spaced fastening receiving openings, parts on the body portion having openings aligned with the fastening receiving openings, hooks having portions abutting the upper side of said cover and other portions passing and secured through the aligned openings by means abutting the lower sides of said parts of the body portion to clamp said cover in place and mount the hooks at spaced apart points on the body, and a handle carrier having loop openings fitted on said hooks.

2. A battery servicing kit comprising, a body portion of molded material resistant to battery acid having unitarily therein at the ends compartments to contain servicing implements and parts and a centrally molded in chamber for battery servicing liquid, a cover for said chamber having an opening to give access to the liquid chamber and having a side wall portion inclined upwardly and inwardly with access openings through the top of said cover surrounded by annular upstanding sleeves, clips carried by the body portion outside of the liquid chamber and provided with fastening receiving openings, said cover being provided with fastening receiving openings registering with the openings of the clips, hooks provided with threaded shanks received through the openings and having arm portions bearing upon the cover with the hook formations thereof disposed substantially centrally, fastenings received upon the shanks to clamp the cover upon the body portion with the sleeves upstanding between the hook portions, and a handle carrier caught upon said hook portions and arched above the upstanding sleeves.

JOSEPH C. THOMAS.